United States Patent
Wang et al.

(10) Patent No.: US 8,489,916 B2
(45) Date of Patent: Jul. 16, 2013

(54) MULTI-DISK FAULT-TOLERANT SYSTEM, METHOD FOR GENERATING A CHECK BLOCK, AND METHOD FOR RECOVERING A DATA BLOCK

(75) Inventors: Yulin Wang, Chengdu (CN); Jianye Yao, Chengdu (CN)

(73) Assignees: Chengdu Huawei Symantec Technologies Co., Ltd., Chengdu (CN); University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 13/365,960

(22) Filed: Feb. 3, 2012

(65) Prior Publication Data

US 2012/0260125 A1 Oct. 11, 2012

Related U.S. Application Data

(63) Continuation of application No. PCT/CN2010/075678, filed on Aug. 3, 2010.

(30) Foreign Application Priority Data

Aug. 4, 2009 (CN) .......................... 2009 1 0090420

(51) Int. Cl.
*G06F 11/00* (2006.01)
(52) U.S. Cl.
USPC ........................................ 714/6.24; 714/770
(58) Field of Classification Search
None
See application file for complete search history.

(56) References Cited

U.S. PATENT DOCUMENTS

| | | | |
|---|---|---|---|
| 6,138,125 A | 10/2000 | Demoss | |
| 6,871,317 B1 * | 3/2005 | Corbett | .......................... 714/800 |
| 7,321,905 B2 * | 1/2008 | Hartline et al. | ......................... 1/1 |
| 7,356,757 B2 | 4/2008 | Chen | |

FOREIGN PATENT DOCUMENTS

| | | |
|---|---|---|
| CN | 1655126 A | 8/2005 |
| CN | 1722096 A | 1/2006 |
| CN | 101251812 A | 8/2008 |
| CN | 101470582 A | 7/2009 |
| CN | 101625652 A | 1/2010 |
| WO | WO 2004032114 A2 | 4/2004 |

OTHER PUBLICATIONS

International Search Report in corresponding PCT Application No. PCT/CN2010/075678 (Dec. 2, 2010).
Written Opinion of the International Search Report in corresponding PCT Application No. PCT/CN2010/075678 (Dec. 2, 2010).

* cited by examiner

*Primary Examiner* — Gabriel Chu
(74) *Attorney, Agent, or Firm* — Leydig, Voit & Mayer, Ltd.

(57) ABSTRACT

A multi-disk fault-tolerant system, a method for generating a check block, and a method for recovering a data block are provided. The multi-disk fault-tolerant system includes a disk array and a calculation module connected through a system bus, the disk array is formed by p disks, and a fault-tolerant disk amount of the disk array is q; data in the disk array is arranged according to a form of a matrix M of $(m+q) \times p$, where m is a prime number smaller than or equal to p−q; in the matrix M, a $0^{th}$ row is virtual data blocks being virtual and having values being 0, a $1^{st}$ row to an $(m-1)^{th}$ row are data blocks, an $m^{th}$ row to an $(m+q-1)^{th}$ row are check blocks. Therefore, during a procedure of generating the check block and recovering the data block in the multi-disk fault-tolerant system, calculation complexity is lowered.

7 Claims, 8 Drawing Sheets

| D0 | D1 | D2 | D3 | D4 | D5 | D6 |
|---|---|---|---|---|---|---|
| c3 | d4 | e5 | f6 | g7 | a1 | b2 |
| f4 | g5 | a6 | b7 | c1 | d2 | e3 |
| d5 | e6 | f7 | g1 | a2 | b3 | c4 |
| b6 | c7 | d1 | e2 | f3 | g4 | a5 |
| e7 | f1 | g2 | a3 | b4 | c5 | d6 |
| 1 | 2 | 3 | 4 | 5 | 6 | 7 |
| a | b | c | d | e | f | g |

| D0 | D1 | D2 | D3 | D4 | D5 | D6 |
|---|---|---|---|---|---|---|
| 0 | 0 | 0 | 0 | 0 | 0 | 0 |
| D0 | D1 | D2 | D3 | D4 | D5 | D6 |
| D7 | D8 | D9 | D10 | D11 | D12 | D13 |
| D14 | D15 | D16 | D17 | D18 | D19 | D20 |
| D21 | D22 | D23 | D24 | D25 | D26 | D27 |
| P1 | P2 | P3 | P4 | P5 | P6 | P7 |
| P8 | P9 | P10 | P11 | P12 | P13 | P14 |

| D0 | D1 | D2 | D3 | D4 | D5 | D6 |
|---|---|---|---|---|---|---|
| c3 | d4 | e5 | f6 | g7 | a1 | b2 |
| f4 | g5 | a6 | b7 | c1 | d2 | e3 |
| d5 | e6 | f7 | g1 | a2 | b3 | c4 |
| b6 | c7 | d1 | e2 | f3 | g4 | a5 |
| e7 | f1 | g2 | a3 | b4 | c5 | d6 |
| 1 | 2 | 3 | 4 | 5 | 6 | 7 |
| a | b | c | d | e | f | g |

| D0 | D1 | D2 | D3 | D4 | D5 | D6 |
|---|---|---|---|---|---|---|
| c3 | d4 | e5 | f6 | g7 | a1 | b2 |
| f4 | g5 | a6 | b7 | c1 | d2 | e3 |
| d5 | e6 | f7 | g1 | a2 | b3 | c4 |
| b6 | c7 | d1 | e2 | f3 | g4 | a5 |
| e7 | f1 | g2 | a3 | b4 | c5 | d6 |
| 1 | 2 | 3 | 4 | 5 | 6 | 7 |
| a | b | c | d | e | f | g |

FIG. 13

MULTI-DISK FAULT-TOLERANT SYSTEM, METHOD FOR GENERATING A CHECK BLOCK, AND METHOD FOR RECOVERING A DATA BLOCK

CROSS-REFERENCE TO RELATED APPLICATION

This application is a continuation of International Application PCT/CN2010/075678, filed on Aug. 3, 2010, which claims priority to Chinese Patent Application No. 200910090420.2, filed on Aug. 4, 2009, which are hereby incorporated by reference in their entireties.

FIELD OF THE INVENTION

The present invention relates to the field of data storage technologies, and in particular, to a multi-disk fault-tolerant system, a method for generating a check block, and a method for recovering a data block.

BACKGROUND OF THE INVENTION

With development of network and wide application of computer technologies, people require increasingly higher performance of a storage system. A Redundant Array of Independent Disks (RAID) adopts methods of striping and redundancy to improve the capacity, the speed, and the reliability of the storage system, so as to become the preferred structure of high performance data storage. The basic concept of the disk array technology has two aspects: data striping is applied to improve the performance and the data redundancy is applied to improve the reliability. Until now, most systems are designed to tolerate a single-disk fault. The design principle of the single-disk fault is that the disk sending faults are fewer, after one disk fault occurs, and before another fault occurs, the disk may have enough time to be recovered from the fault.

With development of the disk technologies and the requirement of users for high performance storage systems, the single-disk fault-tolerance increasingly becomes insufficient. First, the scale of the disk array is continuously increased, increasingly more disks are grouped in one array, correspondingly, the possibility that multiple disk faults occur in one array is increased. Second, the increasing of the capacity of the disk is faster than the increasing of the data access speed, and the time for rebuilding one disk is increased, so that the time window of the disk fault is extended after the array is generated during a procedure of rebuilding one disk. Third, the increasing of the medium storage density results in the decreasing of the reliability of the disk. Fourth, due to the relativity of the disk faults during the actual application and the impact of the external environment and internal elements of the disk, the disk faults are interrelated, which results in that the possibility that multiple disk faults occur in short time is greatly increased.

The conventional technologies of recovering from the multi-disk faults in one disk array may be mainly divided into double-check, double-mirror, RAID51 type, and an improved model mode thereof. In the double-mirror mode, the data is mirrored twice, so that three copies of the data are acquired, for each writing request, three disk write operations need to be incurred to update each of the copies, and storage space being triple of that of an unprotected array needs to be used.

In the RAID51 type mode, the single-disk fault is prevented from damaging the data, and the RAID5 array is mirrored to protect up to three random disk faults, for one write request, two disk read operations and four disk write operations are incurred. In the double-check mode, the RAID5 type mode is expanded to double-check, under the mode, each write request incurs at least three disk read operations and three disk write operations.

The RAID6 is a double-disk fault-tolerant method of a double-check type mode. Compared with other levels of RAID, the RAID6 has two increased independent fault checking blocks, that is, a check block P and a check block Q, where each strip includes two checking units, that is, a P checking unit and a Q checking unit, where P adopts the parity check code, and Q adopts Reed-Solomon or other check code. When a single-disk fault occurs, P+Q RAID is changed to RAID 5 of N+1 parity check. When a double-disk fault occurs, P+Q RAID is changed to RAID0 without the fault-tolerant capability.

During the implementation of the present invention, inventors find that in the prior art, when the RAID6 performs data processing, Galois field conversion is required, and the conversion procedure requires complex multiply-add operations, so that the calculation complexity is high.

SUMMARY OF THE INVENTION

Embodiments of the present invention are directed to provide a multi-disk fault-tolerant system, a method for generating a check block, and a method for recovering a data block, capable of lowering calculation complexity for generating the check block in the multi-disk fault-tolerant system, and improving a data processing speed.

In order to achieve the objectives, an embodiment of the present invention provides a multi-disk fault-tolerant system, including a disk array and a calculation module connected through a system bus.

The disk array is formed by p disks, where p is a natural number greater than or equal to 3, and a fault-tolerant disk amount of the disk array is q, where q is a natural number smaller than p/2 and not smaller than 2.

Data in the disk array is arranged according to a form of a matrix M of $(m+q)\times p$, where m is a prime number smaller than or equal to p−q; in the matrix M, a $0^{th}$ row is virtual data blocks being virtual and having values being 0, a $1^{st}$ row to an $(m-1)^{th}$ row are data blocks, an $m^{th}$ row to an $(m+q-1)^{th}$ row are a check area; where for each data block in a check group in which a check block $C_{m-1+l,n}$ in the check area is located, a row number is m−k·l, a column number is n+k, a span of k is from 1 to m−1+l, where l is a row number of the check block in the check area, $1 \leq l \leq q$, n is a column number corresponding to the check block, $0 \leq n \leq p-1$; data in the check block is an exclusive-or (XOR) value of data of all data blocks in the check group to which the check block belongs.

The calculation module is configured to perform XOR calculation according to the data block in the check group to generate the check block in the check group, and recover the data block according to the check block when the disk is damaged.

An embodiment of the present invention further provides a method for generating a check block in the multi-disk fault-tolerant system, where the method includes:

acquiring data of all data blocks in a check group to which a check block required to be generated belongs;

acquiring check data of the check block required to be generated according to the data of all the data blocks in the check group; and writing the acquired check data in a corresponding check block in the disk array.

An embodiment of the present invention further provides a method for recovering a data block in a multi-disk fault-tolerant system, where the method includes:

acquiring data of other data blocks in a check group to which a data block to be recovered belongs;

acquiring data of a check block in the check group to which the data block to be recovered belongs;

performing XOR calculation according to the acquired data of the other data blocks in the check group and the acquired data of the check block to acquire data of the data block to be recovered; and writing a calculated value of the data block in the data block to be recovered.

The embodiments of the present invention provide a multi-disk fault-tolerant system, a method for generating a check block in a multi-disk fault-tolerant system, and a method for recovering a data block in a multi-disk fault-tolerant system, during a procedure of generating the check block and recovering the data block in the multi-disk fault-tolerant system, complex multiply-add operation is not required, so as to effectively lower calculation complexity of the multi-disk fault-tolerant system during a data processing procedure, and improve a data processing speed.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

FIG. 13 is a schematic diagram of a data recovering path in the embodiment as shown in FIG. 12.

DETAILED DESCRIPTION OF THE EMBODIMENTS

The technical solution of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
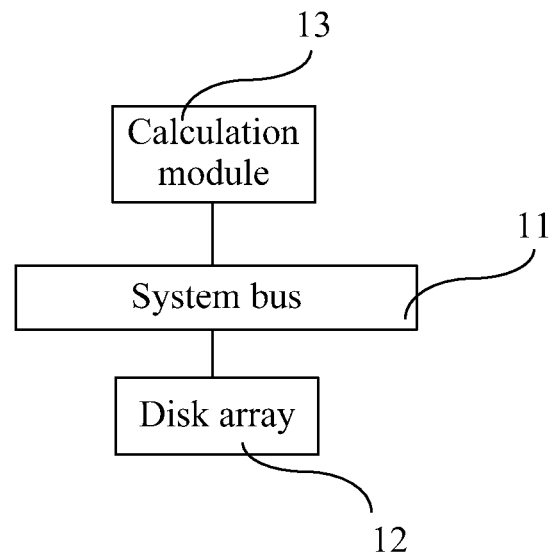
FIG. 1 is a schematic structure diagram of an embodiment of a multi-disk fault-tolerant system according to an embodiment of the present invention.

FIG. 1 is a schematic structure diagram of an embodiment of a multi-disk fault-tolerant system according to an embodiment of the present invention. As shown in FIG. 1, the multi-disk fault-tolerant system includes a disk array 12 and a calculation module 13 connected through a system bus 11.

The disk array 12 is formed by p disks, where p is a natural number greater than or equal to 3, a fault-tolerant disk amount of the disk array is q, where q is a natural number smaller than p/2 and not smaller than 2; data in the disk array is arranged according to a form of a matrix M of (m+q)×p, where m is a prime number smaller than or equal to p−q; in the matrix M, a $0^{th}$ row is virtual data blocks being virtual and having values being 0, a $1^{st}$ row to an $(m-1)^{th}$ row are data blocks, an $m^{th}$ row to an $(m+q-1)^{th}$ row are check blocks; where for each data block in a check group in which a check block $C_{m-1+l,n}$ is located a row number is m-k·l, a column number is n+k, a span of k is from 1 to m−1+l, where l is a row number of the check block in the check area, $1 \leq l \leq q$, n is a column number corresponding to the check block, $0 \leq n \leq p-1$; data in the check block is an XOR value of data of all data blocks in the check group to which the check block belongs.

The calculation module 13 is configured to calculate the check block in the check group according to the data block in the check group, and recover the data block according to the check block when the disk is damaged.

In the multi-disk fault-tolerant system according to this embodiment, in any integer P (P≧3) disks, the fault-tolerance of q ($2 \leq q \leq \lfloor p/2 \rfloor$) disks may be implemented, where each disk m+q−1 (m is a prime number smaller than p−q) row physical units are a data set, the $0^{th}$ row is a virtual physical unit being all 0, the $1^{st}$ row to the $(m-1)^{th}$ row store the data blocks, and the subsequent q rows store the check blocks, where the data of the check block is the XOR value of the data of all data blocks in the check group to which the check block belongs. In the multi-disk fault-tolerant system according to this embodiment, when the check block is generated and the data block is recovered, the complex multiply-add operation is not required, and only the XOR calculation is performed, so as to effectively lower calculation complexity of the multi-disk fault-tolerant system during a data processing procedure.

Figure 2:
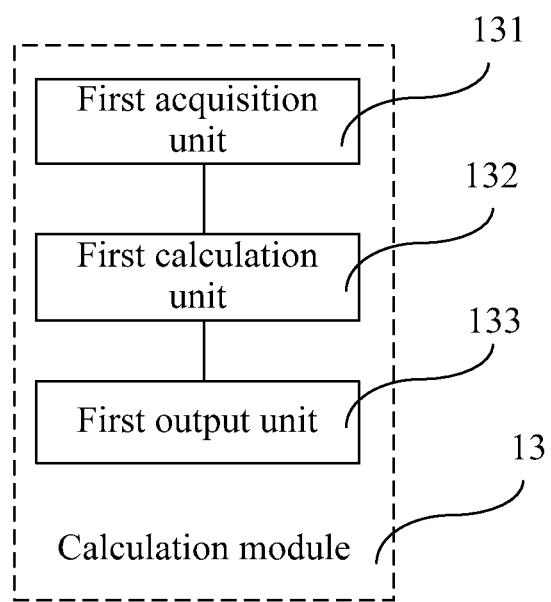
FIG. 2 is a first schematic structure diagram of a calculation module according to an embodiment of the present invention.

FIG. 2 is a first schematic structure diagram of the calculation module according to an embodiment of the present invention. As shown in FIG. 2, the calculation module 13 includes:

a first acquisition unit 131, configured to acquire the data of all the data blocks in the check group to which the check block belongs;

a first calculation unit 132, configured to perform the XOR calculation according to the data of all the data blocks in the check group to which the check block belongs acquired by the first acquisition unit to acquire data of the check block; and a first output unit 133, configured to write the data of the check block calculated by the first calculation unit 132 in the corresponding check block in the disk array.

In this embodiment, for the situation of generating the data block, the calculation module is divided according to functions, the value of the check block is the XOR value of the data of all the data blocks in the check group to which the check block belongs.

Figure 3:
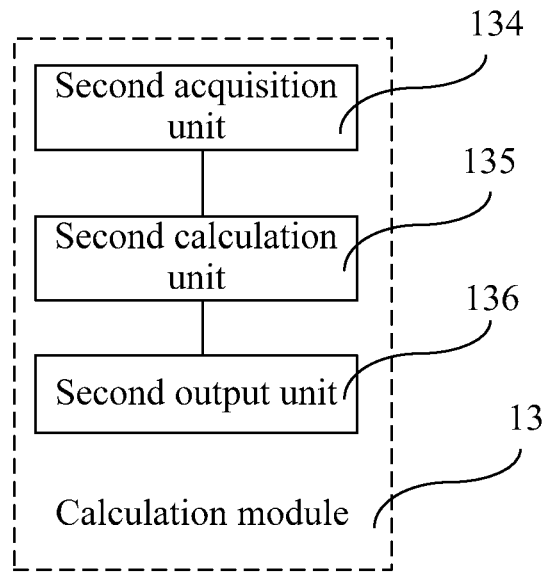
FIG. 3 is a second schematic structure diagram of the calculation module according to an embodiment of the present invention.

FIG. 3 is a second schematic structure diagram of the calculation module according to an embodiment of the present invention. As shown in FIG. 3, the calculation module 13 includes a second acquisition unit 134, a second calculation unit 135, and a second output unit 136.

The second acquisition unit 134 is configured to acquire data of data blocks except for the data block to be recovered and the data of the check block in the check group to which the data block to be recovered belongs.

The second calculation unit 135 is configured to perform the XOR calculation according to the data of the data blocks and the data of the check block acquired by the second acquisition unit 134 to acquire data of the data block to be recovered.

The second output unit 136 is configured to write the data of the data block to be recovered calculated by the second calculation unit 135 in the data block to be recovered.

Figure 4:
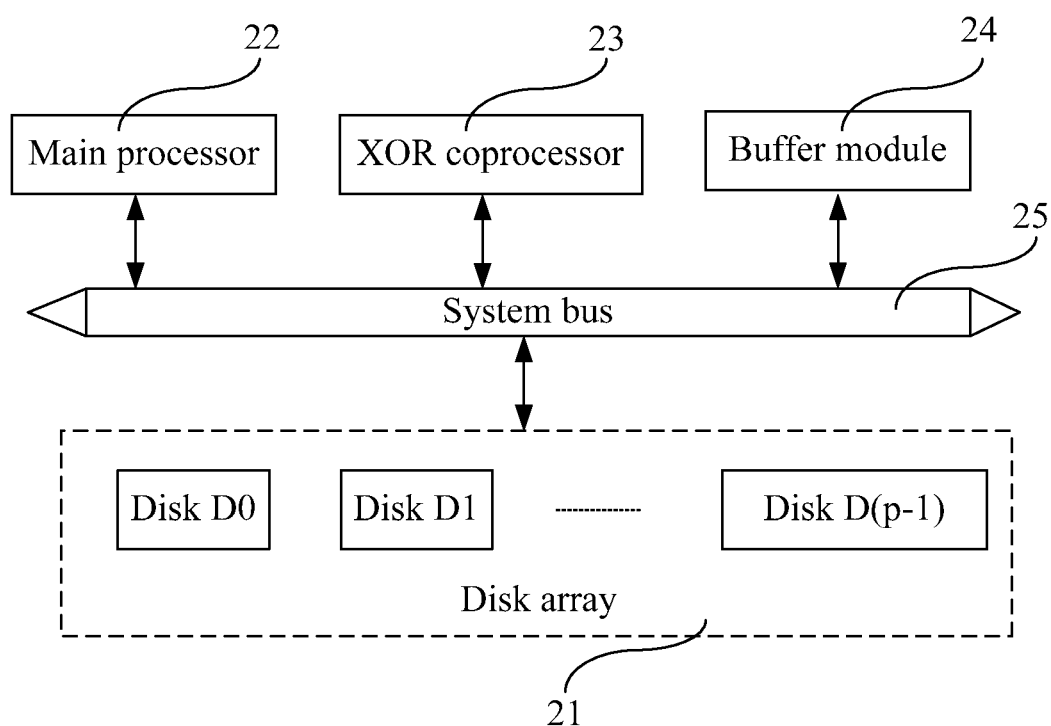
FIG. 4 is a specific schematic structure diagram of a multi-disk fault-tolerant system according to an embodiment of the present invention.

FIG. 4 is a specific schematic structure diagram of a multi-disk fault-tolerant system according to an embodiment of the present invention. As shown in FIG. 4, the multi-disk fault-tolerant system includes a disk array 21, a main processor 22, an XOR coprocessor 23, a buffer module 24, and a system bus 25, where the disk array 21, the main processor 22, the XOR coprocessor 23, and the buffer module 24 are connected through the system bus 25. In this specific embodiment, the disk array is formed by p (p≧3) disks, a fault-tolerant disk amount of the disk array is q (2≦q≦⌊p/2⌋), and for a specific storage format of data in the disk array, reference is made to the embodiment of FIG. 1. The main processor 22 in the embodiment is configured to perform address conversion, system management, buffer management, and other operation of the disk array system, the XOR coprocessor 23 mainly performs XOR calculation of the data block, where the XOR coprocessor may be equivalent to the calculation module of the proceeding embodiment; and the buffer module 24 is configured to buffer the data.

Figures 5, 6, 7:
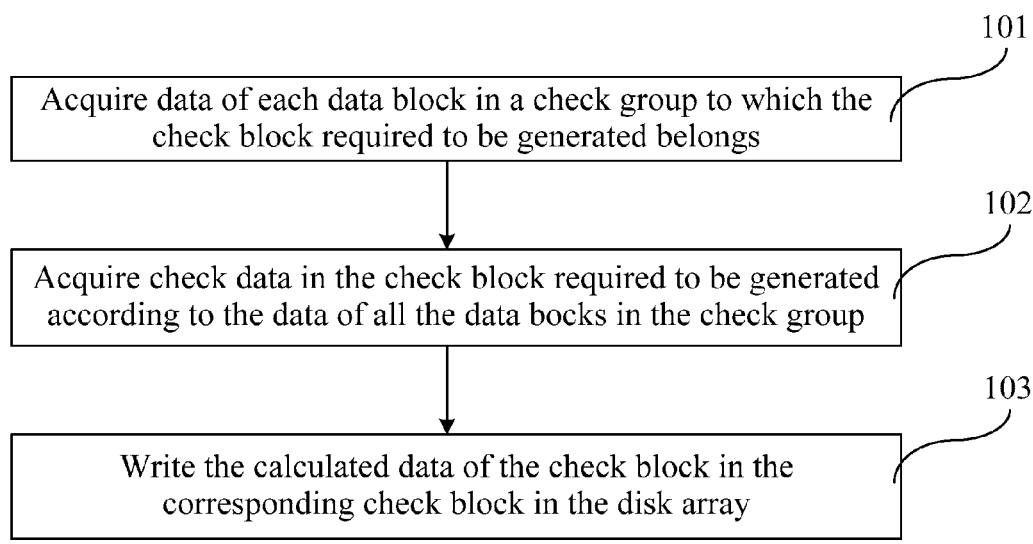
FIG. 5 is a schematic diagram of data layout of a multi-disk fault-tolerant system according to an embodiment of the present invention.
FIG. 6 is a schematic diagram of a relation between a data block and a check block in a multi-disk fault-tolerant system according to an embodiment of the present invention.
FIG. 7 is a schematic flow chart of a method for generating a check block in a multi-disk fault-tolerant system according to an embodiment of the present invention.

FIG. 5 is a schematic diagram of data layout of a multi-disk fault-tolerant system according to an embodiment of the present invention. As shown in FIG. 5, 7 (p=7) disks are taken as an example, each column represents one disk, totally 7 disks exist, which are respectively D0, D1, D2, D3, D4, D5, and D6, and fault-tolerance of 2 (q=2) disks is implemented. In this embodiment, the value of m is 5, one data set has 7 rows of data blocks, where a $0^{th}$ row is virtual data blocks being all 0 without occupying any actual storage space of the disk, a $1^{st}$ row to a $4^{th}$ row are data blocks storing valid data, a $5^{th}$ row and a $6^{th}$ row are check blocks storing XOR check values of corresponding data blocks and providing redundant protection for the data blocks. It may be seen that in the embodiment of the present invention, the check blocks are not stored by a separate disk, but are uniformly distributed on all of the disks.

FIG. 6 is a schematic diagram of a relation between a data block and a check block in a multi-disk fault-tolerant system according to an embodiment of the present invention. As shown in FIG. 6, 7 disks are still taken as an example, where each data block of a $1^{st}$ row to a $5^{th}$ row is included two different check groups, for example, the $1^{st}$ row data block D (1, 0) on the disk D0 is marked as f4, indicating that the data block belongs to the $4^{th}$ group of the first row check and also belongs to the $f^{th}$ group of the second row check, the check block 4 of the $4^{th}$ group is located on the disk D3, the check block f of the $f^{th}$ group is located on the disk D5, the check blocks of the groups to which all the data blocks except for the virtual row (that is, the $0^{th}$ row of the check groups) belong are located on different disks and different check rows, that is, except for the $0^{th}$ row of virtual data blocks, it is not possible that one data block belongs to the two check groups on the same disk, and it is not possible that the same data block belongs to the two check groups on the same check row.

In a check group f, the value of the check block f is equal to the XOR values of all the data blocks marked with f, that is, f=f4⊕f1⊕f7⊕f6⊕f3. If $C_{i,j}$ is a physical data block of an $i^{th}$ row and a $j^{th}$ column, in this embodiment, for the first row check block C(5, 0), m=5, l=1, the span of k is from 1 to 5, for the data block of the check group to which the check block belongs a row number is m−k·l and a column number is n+k, after calculation, the data blocks C(4,1), C(3,2), C(2,3), C(1, 4), and C(0,5) are the data blocks of the check group, and similarly, through calculation, the situation of the data blocks of the check groups to which other check blocks of the first row belongs may be known, the value of each check block is the XOR value of each data block in the check group to which the check block belongs, where for the specific situation, reference is made to the following formulas:

A. for the first row check block $$C(5,0)=C(4,1)\oplus C(3,2)\oplus C(2,3)\oplus C(1,4)\oplus C(0,5)$$

$$C(5,1)=C(4,2)\oplus C(3,3)\oplus C(2,4)\oplus C(1,5)\oplus C(0,6)$$

$$C(5,2)=C(4,3)\oplus C(3,4)\oplus C(2,5)\oplus C(1,6)\oplus C(0,0)$$

$$C(5,3)=C(4,4)\oplus C(3,5)\oplus C(2,6)\oplus C(1,0)\oplus C(0,1)$$

$$C(5,4)=C(4,5)\oplus C(3,6)\oplus C(2,0)\oplus C(1,1)\oplus C(0,2)$$

$$C(5,5)=C(4,6)\oplus C(3,0)\oplus C(2,1)\oplus C(1,2)\oplus C(0,3)$$

$$C(5,6)=C(4,0)\oplus C(3,1)\oplus C(2,2)\oplus C(1,3)\oplus C(0,4)$$

For the second row check block C(6, 0), m=5, l=2, the span of k is from 2 to 6, for the data block of the check group to which the check block belongs a row number is m−k·l and a column number is n+k, after calculation, the data blocks C(1,2), C(4,3), C(2,4), C(0,5), and C(3,6) are the data blocks of the check group, and similarly, through calculation, the situation of the data blocks of the check groups to which other check blocks of the second row belongs may be known, the value of each check block is the XOR value of each data block in the check group to which the check block belongs, where for the specific situation, reference is made to the following formulas:

B. for the second row check block $$C(6,0)=C(1,2)\oplus C(4,3)\oplus C(2,4)\oplus C(0,5)\oplus C(3,6)$$

$$C(6,1)=C(1,3)\oplus C(4,4)\oplus C(2,5)\oplus C(0,6)\oplus C(3,0)$$

$$C(6,2)=C(1,4)\oplus C(4,5)\oplus C(2,6)\oplus C(0,0)\oplus C(3,1)$$

$$C(6,3)=C(1,5)\oplus C(4,6)\oplus C(2,0)\oplus C(0,1)\oplus C(3,2)$$

$$C(6,4)=C(1,6)\oplus C(4,0)\oplus C(2,1)\oplus C(0,2)\oplus C(3,3)$$

$$C(6,5)=C(1,0)\oplus C(4,1)\oplus C(2,2)\oplus C(0,3)\oplus C(3,4)$$

$$C(6,6)=C(1,1)\oplus C(4,2)\oplus C(2,3)\oplus C(0,4)\oplus C(3,5)$$

FIG. 7 is a schematic flow chart of a method for generating a check block in a multi-disk fault-tolerant system according to an embodiment of the present invention. As shown in FIG. 7, the method includes the following steps.

Step 101: Acquire data of each data block in a check group to which the check block required to be generated belongs. The method for generating the check block in this embodiment is based on the multi-disk fault-tolerant system of FIG. 1, in the multi-disk system, a row number and a column number of each data block in a check group to which a check block $C_{m-1+l,n}$ belongs satisfy the following conditions, the row number of the data block is m−k·1, the column number of the data block is n+k, the span of k is from 1 to m−1+l, where l is the row number of the check block in the check area, $1 \leq l \leq q$, and n is the corresponding column number of the check block, $0 \leq n \leq p-1$.

Specifically, after the data of all the data blocks of the check group to which the check block belongs is acquired, XOR calculation is performed to obtain the value of the check block, and specifically, the calculation may be performed according to the following formula:

$$C_{m-1+l,n} = \bigoplus_{k=1}^{m-1+l} C_{(m-k\cdot l)_m,(n+k)_p}$$

After the data of each data block in the check group is acquired, the XOR calculation is performed according to the formula to obtain the data of the check block.

Step 102: Acquire check data in the check block required to be generated according to the data of all the data blocks in the check group.

Step 103: Write the calculated data of the check block in the corresponding check block in the disk array.

In the method for generating the check block in the multi-disk fault-tolerant system in this embodiment, by acquiring the data of each data block in the check group, the data of the check block is acquired according to the data of each of the data blocks, where the data block and the check block adopt the disposing manner of the embodiment as shown in FIG. 1, so that when the check block is generated, the complex multiply-add operation is not required, so as to effectively lower calculation complexity of the multi-disk fault-tolerant system during the data processing procedure.

Figure 8:
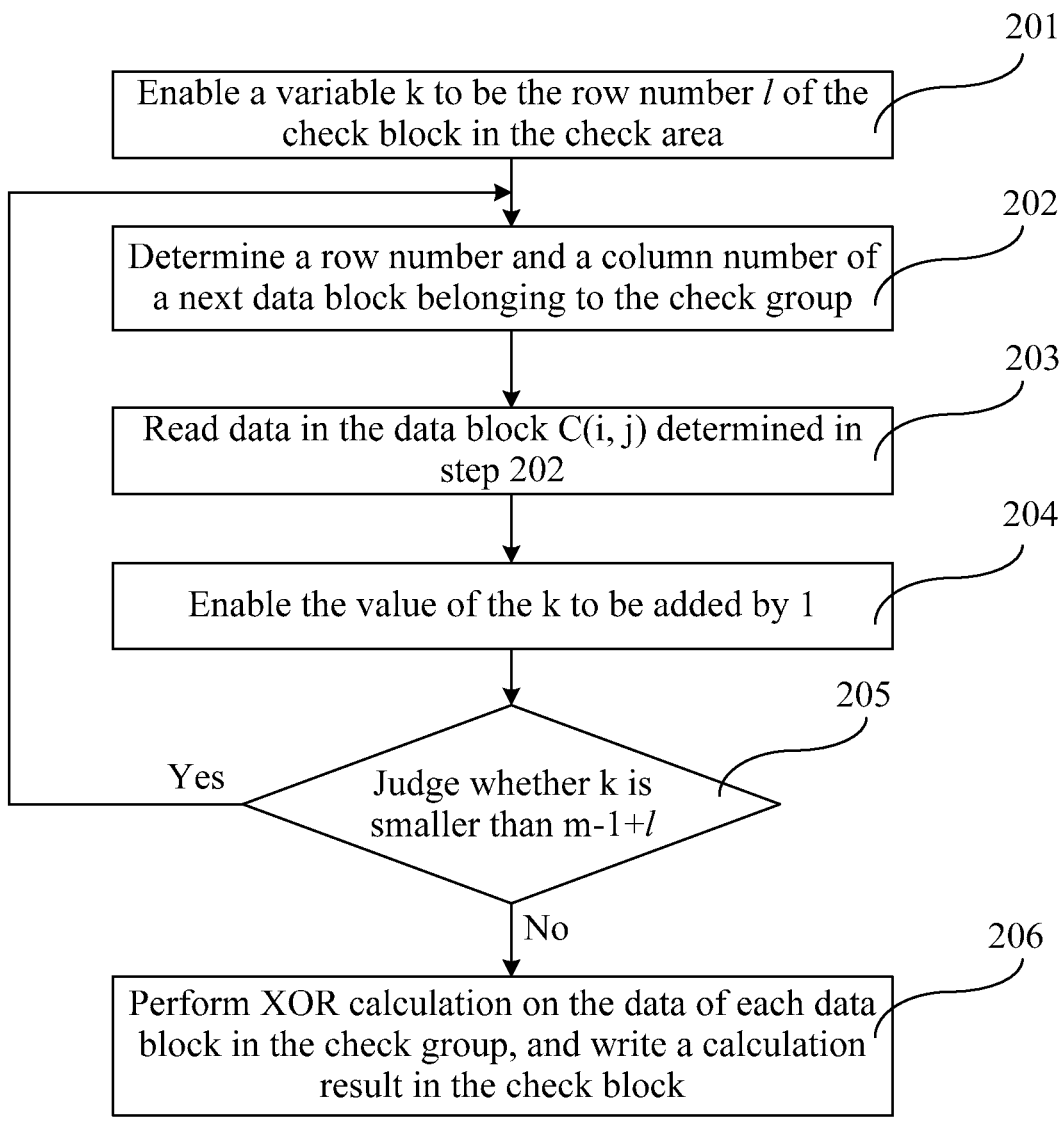
FIG. 8 is a schematic flow chart of a specific embodiment in the embodiment as shown in FIG. 7.

The specific calculate procedure in the proceeding embodiment may be executed according to steps as shown in FIG. 8.

Step 201: Enable a variable k to be the row number l of the check block in the check area.

Step 202: Determine a row number and a column number of a next data block belonging to the check group.

Specifically, by calculating (m−k×l) % m, the row number i is determined, m is a preset prime number smaller than p−q, and by calculating (n+k) % p, the column number j is determined.

Step 203: Read data in the data block C(i, j) determined in step 202.

Step 204: Enable the value of the k to be added by 1.

Step 205: Judge whether k is smaller than m−1+l, if k is smaller than m−1+l, execute step 202, and if k is not smaller than m−1+l, execute step 206.

Step 206: Perform XOR calculation on the data of each data block in the check group, and write a calculation result in the check block. In addition, if in step 203 the data of more than one data block is read, the XOR calculation is performed on the read data after the data is read from the data blocks, and in the subsequent process, the XOR calculation is performed by utilizing the XOR value calculated before and the data read this time, and in the step, only the final XOR calculation result is written in the check block.

In the method for generating the check block in the multi-disk fault-tolerant system in this embodiment, the disk data check block may be acquired by using fewer XOR calculations, so as to effectively lower calculation complexity of the multi-disk fault-tolerant system.

Figure 9:
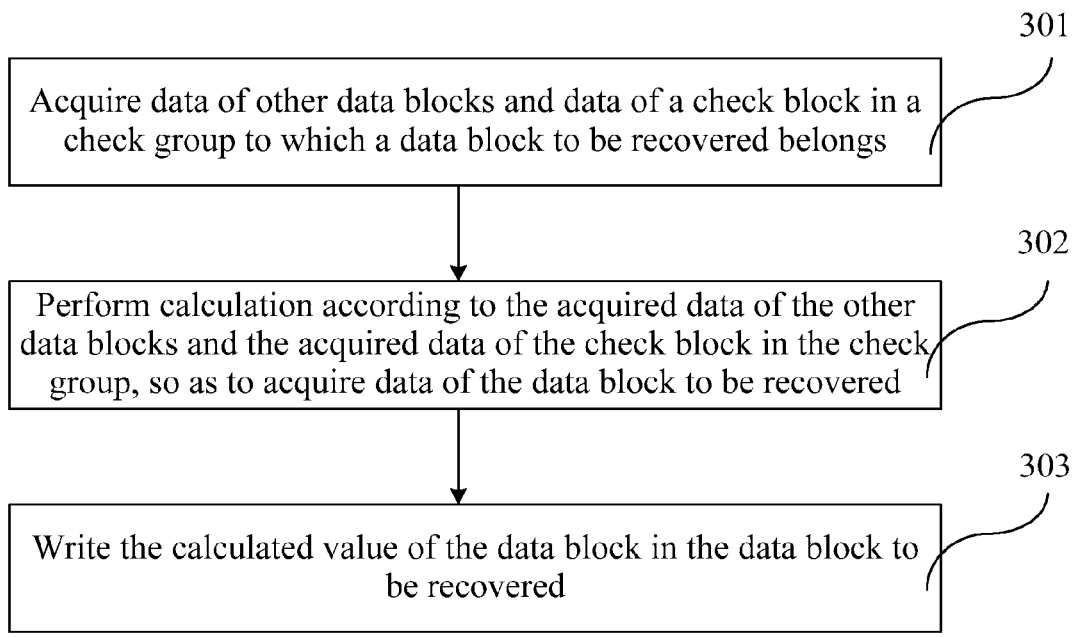
FIG. 9 is a schematic flow chart of a method for recovering a check block in a multi-disk fault-tolerant system according to an embodiment of the present invention.

FIG. 9 is a schematic flow chart of a method for recovering a check block in a multi-disk fault-tolerant system according to an embodiment of the present invention, in this embodiment, the method for recovering the data block is based on the multi-disk fault-tolerant system as shown in FIG. 1, and as shown in FIG. 9, the method includes the following steps.

Step 301: Acquire data of other data blocks and data of a check block in a check group to which a data block to be recovered belongs.

Step 302: Perform calculation according to the acquired data of the other data blocks and the acquired data of the check block in the check group, so as to acquire data of the data block to be recovered.

Step 303: Write the calculated value of the data block in the data block to be recovered.

In the method for recovering the data block in the multi-disk fault-tolerant system in this embodiment, by acquiring the data of the other data blocks and the data of the check block in the check group to which the data block to be recovered belongs, the data to be recovered is acquired according to the data, where the data block and the check block adopt the disposing manner of the embodiment as shown in FIG. 1, so that when the check block is acquired, the complex multiply-add operation is not required, so as to effectively lower calculation complexity of the multi-disk fault-tolerant system during the data processing procedure.

The step of performing the calculation according to the acquired data of the other data blocks and the acquired data of the check block in the check group, so as to acquire the data of the data block to be recovered includes: performing the XOR processing according to the data of the check block and the data of the other data blocks to acquire the data of the data block to be recovered.

Figure 10:
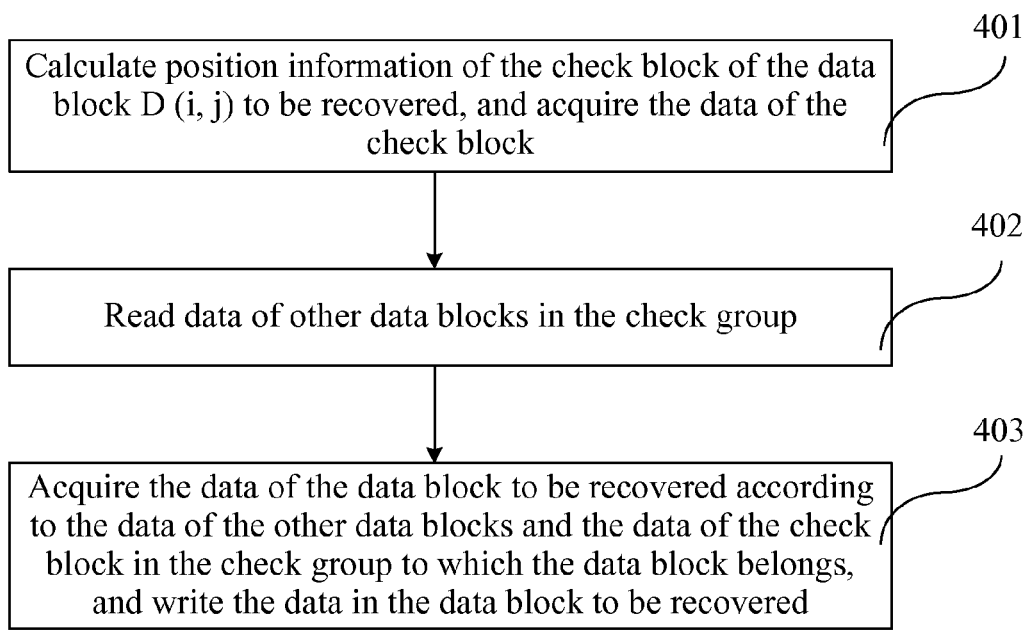
FIG. 10 is a schematic flow chart of a specific embodiment in the embodiment as shown in FIG. 9.

When the method for recovering the data block in the embodiment is used in a double-disk fault-tolerant system, the first row of check blocks or the second row of check blocks of the check area may be used for checking, for example, when the data block to be recovered is D (i, j), the steps as shown in FIG. 10 may be included.

Step 401: Calculate position information of the check block of the data block D (i, j) to be recovered, and acquire the data of the check block.

When two rows of check blocks exist, the first row or the second row of check blocks may be used to perform data recovering. When the check block P (m, w) on the first row (that is, the $m^{th}$ row) of the check area of the data block is used, the column number w may be acquired according to the following calculation expression: w=(j−(m−i)) % p, where p is the fault-tolerant disk amount. When the check block P (m+1, y) on the second row (that is, the $(m+1)^{th}$ row) of the check area of the data block is used, the column number y may be acquired according to the following formula: y=(j−(a×m−i)/2) % p, where the value of a is as follows: when m−i is an odd number or is smaller than 4, a is 2, and when m−i is not an odd number or is not smaller than 4, a is 1. After the position information of the check block is acquired, the data in the check block may be acquired. In the step, the method for calculating the column number of the first row and the second row of the check blocks of the check area according to the position information of data block in the double-disk fault-tolerant system is also applicable to the multi-disk fault-tolerant system formed by more than three disks.

Step 402: Read data of other data blocks in the check group.

The row number and the column number of the other data blocks in the check group may also be acquired through calculation. For the check group to which the check block P (m, w) on the first row in step 401 belongs, the row number of the data block is (m−k) % m, and the column number is (n+k) % p, where the value of k is from 1 to m; and for the check group to which the check block P (m+1, y) on the second row in step 401 belongs, the row number of the data block is (m−2k) % m, and the column number is (n+k) % p.

Step 403: Acquire the data of the data block to be recovered according to the data of the other data blocks and the data of the check block in the check group to which the data block belongs, and write the data in the data block to be recovered.

The data of the data block to be recovered may be acquired by performing the XOR calculation according to the data of other data blocks and the data of the check block in the check group to which the data block belongs.

In the embodiment, the method for recovering the data block to be recovered in the multi-disk fault-tolerant system is provided, the data block may be updated at less cost, and during implementation of the fault-tolerant system of q disks, when one data block is updated, only q+1 times of disk write operation are required, thereby improving the write performance of the multi-disk fault-tolerant system.

Figure 11:
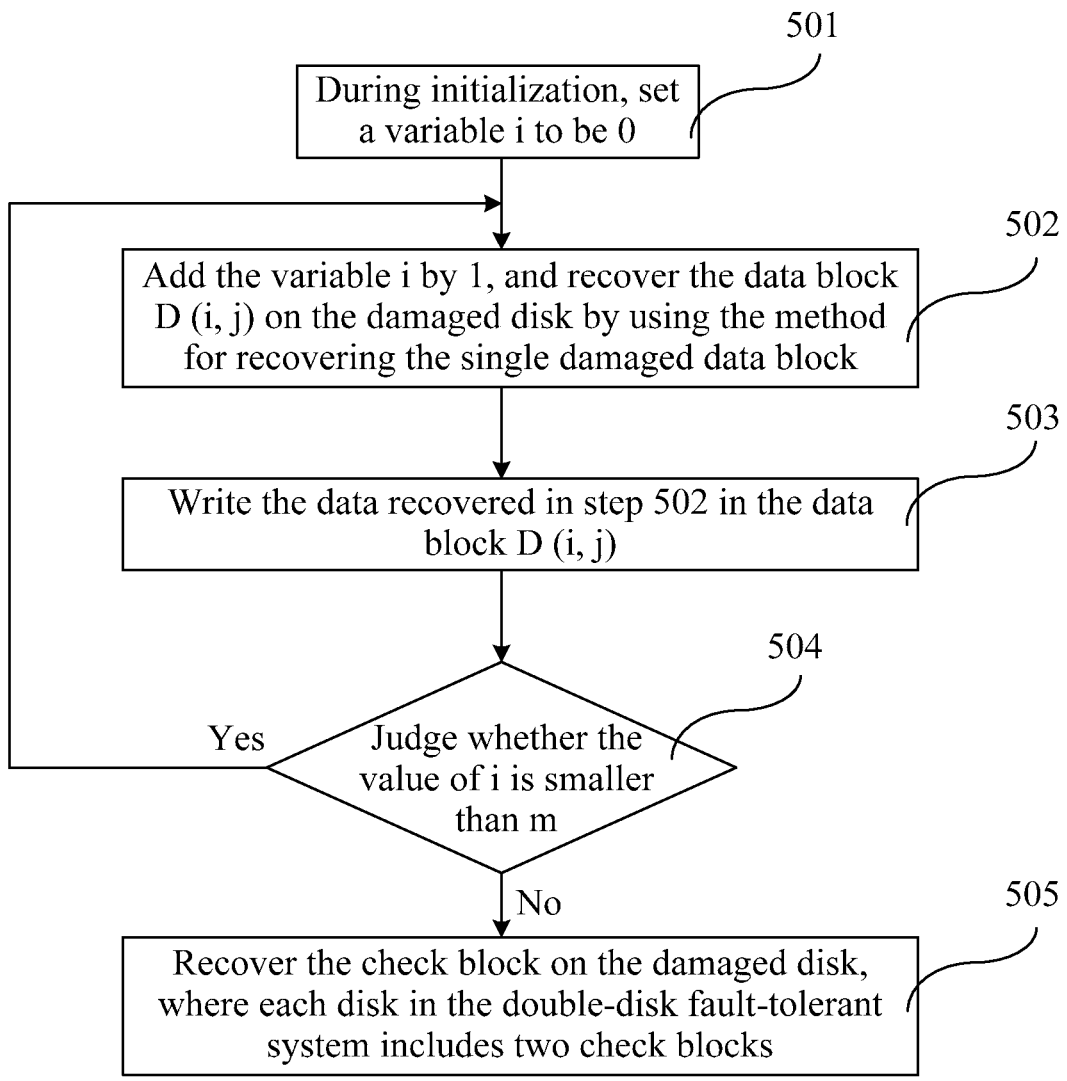
FIG. 11 is a schematic flow chart of rebuilding a single fault disk in a double-disk fault-tolerant system according to an embodiment of the present invention.

FIG. 11 is a schematic flow chart of rebuilding a single fault disk in a double-disk fault-tolerant system according to an embodiment of the present invention. In this embodiment, taking a double-disk fault-tolerant system having a single disk fault as an example, a method for recovering a single disk is introduced, and as shown in FIG. 11, the method includes the following steps.

Step 501: During initialization, set a variable i to be 0.

Step 502: Add the variable i by 1, and recover the data block D (i, j) on the damaged disk by using the method for recovering the single damaged data block in the embodiment, that is, acquire the data of the damaged data block by acquiring the data of the check block of the check group to which the damaged data block belongs and the data of other data blocks in the check group and by performing XOR calculation on the acquired data.

Step 503: Write the data recovered in step 502 in the data block D (i, j).

Step 504: Judge whether the value of i is smaller than m, m is a set prime number smaller than p−q, where p is a disk amount in the disk array, q is a fault-tolerant disk amount, when the value of i is smaller than m, execute step 502, and when the value of i is greater than or equal to m, execute step 505.

Step 505: Recover the check block on the damaged disk, where each disk in the double-disk fault-tolerant system includes two check blocks, so that in the step, firstly, acquiring the data of each data block of the check group to which the check block P (m, j) belongs and the XOR calculation is performed, and a result of the XOR calculation is written in the check block P (m, j); acquiring the data of each data block of the check group to which the check block P (m+1, j) belongs and the XOR calculation is performed, and a result of the XOR calculation is written in the check block P (m+1, j).

Figure 12:
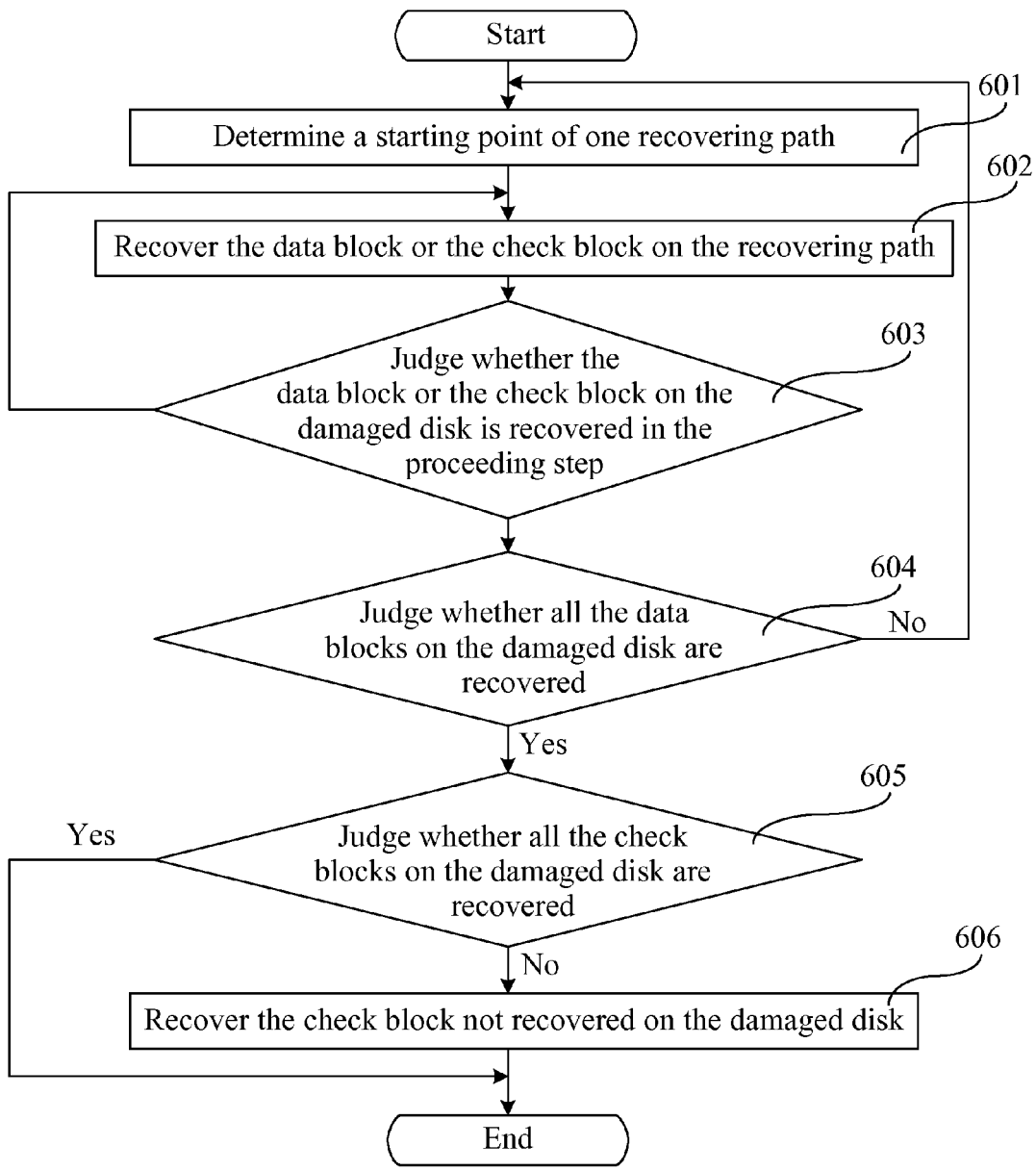
FIG. 12 is a schematic flow chart of a method for recovering multiple disks in a multi-disk fault-tolerant system according to an embodiment of the present invention.

FIG. 12 is a schematic flow chart of a method for recovering multiple disks in a multi-disk fault-tolerant system according to an embodiment of the present invention. As shown in FIG. 12, the method includes the following steps.

Step 601: Determine a starting point of one recovering path.

For example, taking a double-disk fault-tolerant system as an example, sequence numbers of two fault disks are enabled to be a and b, that is, column numbers of the two fault disks in the disk array are a and b, and a>b, it is determined that one recovering path has two situations. In the first situation, when the two fault disks are adjacent, that is, a=(b+1) % p, two recovering paths exist, for one recovering path, the starting point is the data block on the b disk recovered by the check block P (m, (a+1) % p), and for the other recovering path, the starting point is the data block on the a disk recovered by the check block P (m+1, (b−1) % p). In the second situation, when the two fault disks are not adjacent, that is, a≠(b+1) % p, 4 recovering paths exist, for the first one, the starting point is the data block on the a disk recovered by the check block P (m, (b+1) % p), for the second one, the starting point is the data block on the b disk recovered by the check block P (m, (a+1) % p), for the third one, the starting point is the data block on the a disk recovered by the check block P (m+1, (b−1) % p), and for the fourth one, the starting point is the data block on the b disk recovered by the check block P (m+1, (a−1) % p).

Step 602: Recover the data block or the check block on the recovering path.

Specifically, after the starting point of one recovering path is determined, the data block is recovered by alternately using the check blocks on the different check rows. For example, in the double-disk fault-tolerant system, the data block D (i, b) on a fault disk b is recovered by using the check block on the first check row, the next data block to be recovered on the recovering path is the data block D (j, a) on the other fault disk a, where the check block of the check group to which the D (j, a) and the D (i, b) belong is on the second check row. Similarly, if the data block D (i, b) on a fault disk b is recovered by using the check block on the second check row, the next data block to be recovered on the recovering path is the data block D (j, a) on the other fault disk a, where the check block of the check group to which the D (j, a) and the D (i, b) belong is on the first check row. Under the situation of a>b, the value of j may be determined according to j=(i−(a−b)) % m, here the check block of the check group to which the D(j,a) and the D(i,b) belong is on the first check row; or the value of j may be determined according to j=(i−2×(a−b)) % m, here the check block of the check group to which the D(j,a) and the D(i,b) belong is on the second check row, where m is any preset prime number smaller than a different between the disk amount p and the fault-tolerant disk amount q in the disk array. For the specific procedure of recovering the single data block, reference is made to the embodiment of the method for recovering the data block in the multi-disk fault-tolerant system shown in FIG. 9, and for the recovering of the check block, reference is made to the embodiment shown in FIG. 7.

Step 603: Judge whether the data block or the check block on the damaged disk is recovered in the proceeding step. If the check block is recovered, the recovering path is terminated, and step 604 is executed, and if the data block is recovered, step 602 is executed.

Step 604: Judge whether all the data blocks on the damaged disk are recovered. If all the data blocks are recovered, step 605 is executed, and if not all the data blocks are recovered, step 601 is executed, and one recovering path is determined again.

Step 605: Judge whether all the check blocks on the damaged disk are recovered. If all the check blocks are recovered, the process is ended, and if not all the check blocks are recovered, step 606 is executed.

Step 606: Recover the check block not recovered on the damaged disk.

In the following, a specific embodiment is used to describe the procedure of determining the recovering path and recovering the data block and the check block on the path in step 601 and step 602, taking a disk array formed by 7 disks having two adjacent fault disks D3 and D4 (that is, the disks in the disk array having the column numbers being 3 and 4) as an example, as shown in FIG. 13, the recovering of the data block of the fault disk has two parallel recovering paths. For the starting point of one recovering path, a data block C (0, 3) (f6) on D3 is recovered by using a check block C (5, 5) (6) of a first check row on a disk D5 on a right side of a fault disk, then a C (3, 4) (f3) of the D4 fault disk is recovered by using a check block C (6, 5) (f) of a second check row according to the data block C (0, 3) (f6), a C (4, 3) (a3) of the fault disk D3 is recovered by using a check block C (5, 2) (3) of the first check row according to the data block C (3, 4) (f3), a C (2, 4) (a2) of the fault disk D4 is recovered by using a check block C (5, 2) (a) of the second check row according to the data block C (4, 3) (a3), a C (2, 3) (e2) of the fault disk D3 is recovered by using a check block C (5, 1) (2) of the first check row according to the data block C (2, 4) (a2), and a check block C (6, 4) (e) of the second check row of the fault disk D4 is generated according to a check group to which the data block C (2, 3) (e2) belongs, so that the path is terminated. The recovering path may be simply indicated as:

$C(0,3)f6 \rightarrow C(3,4)f3 \rightarrow C(4,3)a3 \rightarrow C(2,4)a2 \rightarrow C(3,3)$
$e2 \rightarrow C(6,4)e$ For the starting point of the other recovering path, a data block C (1, 4) (c1) of the fault disk D4 is recovered by using a check block C (6, 2) (c) of the second check row of the disk D2, then a C (2, 3) (g1) of the fault disk D3 is recovered by using a check block C (5, 0) (1) of the first check row according to the data block C (1, 4) (c1), a C (0, 4) (g7) of the fault disk D4 is recovered by using a check block C (6, 6) (g) of the first check row according to the data block C (2, 3) (g1), a C (1, 3) (b7) of the fault disk D3 is recovered by using a check block C (5, 6) (7) of the first check row according to the data block C (0, 4) (g7), a C (4, 4) (b4) of the fault disk D4 is recovered by using a check block C (6, 1) (b) of the second check row according to the data block C (1, 3) (b7), and a check block C (5, 3) (4) of the first check row of the fault disk D3 is generated according to a check group to which the data block C (4, 4) (b4) belongs, so that the path is terminated. The recovering path may be simply indicated as:

$C(1,4)c1 \rightarrow C(2,3)g1 \rightarrow C(0,4)g7 \rightarrow C(1,3)b7 \rightarrow C(4,4)$
$b4 \rightarrow C(5,3)4$ In addition, residual C (6,3) d and C (5,4) 5 are the check blocks, and since all the data blocks are recovered, the two check blocks may be directly calculated by using the manner for generating the check block, and at the moment, the data blocks and the check blocks of the disks D3 and D4 are recovered.

It may be seen from the two recovering paths that the starting point of the path is the check block of the first check row to the right of the fault disk or the check block of the second check row to the left, then the data block of the fault disk is recovered by alternately using the check blocks of the first check row and the check blocks of the second check row, until the check block is recovered, the two paths may be performed along at the same time, thereby improving the recovering speed. The method for recovering the data of the non-adjacent double-disk fault is the same as the adjacent double-disk fault, except that four parallel recovering paths exist.

In the embodiment of the present invention, the double-disk fault-tolerance is taken as an example for description, meanwhile for the multi-disk fault-tolerant system having three or more disks, the method for recovering the data block according to the embodiment of the present invention may also be used, where when the recovering path is determined, the sequence and the method for crossly recovering the data blocks on each recovering path are different.

One disk in the embodiment of the present invention may be regarded as one storage node in a Storage Area Network (SAN), that is, the multi-disk fault-tolerant system and the method according to the embodiments of the present invention are applied to the SAN technique, and the method for encoding and decoding the data is the same as the proceeding embodiment. In addition, for fault-tolerance of a distributed storage system, the single disk in the embodiment of the present invention is used as one network node in the distributed storage system, so that the embodiment of the present invention may be applied to the distributed storage system, and the method for encoding and decoding the data is the same as the proceeding embodiment.

In the multi-disk fault-tolerant system, the method for generating the check block in the multi-disk fault-tolerant system, the method for recovering the data block in the multi-disk fault-tolerant system, and the method for recovering the multiple disks in the multi-disk fault-tolerant system according to the embodiments of the present invention, the check block of the disk data may be generated by using less XOR calculation, thereby effectively lowering the calculation complexity of the multi-disk fault-tolerant system, and achieving least cost of updating the data block. During implementation of the fault-tolerant system of q disks, when one data block is updated, only q+1 times of disk write operation are required, thereby improving the write performance of the multi-disk fault-tolerant system. In addition, the embodiment of the present invention may acquire a load balancing characteristic of each disk, no matter the check block is calculated or the data block is recovered, the loads of the disks are balanced, so as to improve the overall performance of the multi-disk fault-tolerant system.

Persons skilled in the art may further realize that, in combination with the embodiments herein, units and algorithm steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the present invention.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above descriptions are merely preferred embodiments of the present invention, but are not intended to limit the present invention. Any modification, equivalent replacement, or improvement made without departing from the principle of the present invention should fall within the scope of the present invention.

What is claimed is:

1. A multi-disk fault-tolerant system, comprising a disk array and a calculation module connected through a system bus, wherein the disk array is formed by p disks, wherein p is a natural number greater than or equal to 5, and a fault-tolerant disk amount of the disk array is q, wherein q is a natural number smaller than p/2 and not smaller than 2;

data in the disk array is arranged according to a form of a matrix M of (m+q)×p, wherein m is a prime number smaller than or equal to p−q; in the matrix M, a $0^{th}$ row is virtual data blocks being virtual and having values being 0, a $1^{st}$ row to an $(m-1)^{th}$ row are data blocks, an $m^{th}$ row to an $(m+q-1)^{th}$ row are a check area; wherein for each data block in a check group in which a check block $C_{m-1+l,n}$ in the check area is located, a row number is (m−k×l) % m, a column number is (n+k) % p, a span of k is from 1 to m−1+l, wherein l is a row number of the check block in the check area, $1 \leq l \leq q$, n is a column number corresponding to the check block, $0 \leq n \leq p-1$; data in the check block is an (exclusive-or) XOR value of data of all data blocks in the check group to which the check block belongs; and the calculation module is configured to calculate the check block $C_{m-1+l,n}$ according to a formula $$C_{m-1+l,n} = \bigoplus_{k=1}^{m-1+l} C_{(m-k\cdot l)_m,(n+k)_p}, 0 \leq n \leq p-1,$$

and recover the data block according to the check block when the disk is damaged.

2. The multi-disk fault-tolerant system according to claim 1, wherein the calculation module comprises:

a first acquisition unit, configured to acquire the data of all the data blocks in the check group to which the check block belongs;

a first calculation unit, configured to perform the XOR calculation according to the data of all the data blocks in the check group to which the check block belongs acquired by the first acquisition unit to acquire the data of the check block; and a first output unit, configured to write the data of the check block calculated by the first calculation unit in the corresponding check block in the disk array.

3. The multi-disk fault-tolerant system according to claim 1, wherein the calculation module comprises:

a second acquisition unit, configured to acquire data of other data blocks except for the data block to be recovered and the data of the check block in the check group to which the data block to be recovered belongs;

a second calculation unit, configured to perform the XOR calculation according to the data of the data blocks and the data of the check block acquired by the second acquisition unit to acquire data of the data block to be recovered; and a second output unit, configured to write the data of the data block to be recovered calculated by the second calculation unit in the data block to be recovered.

4. A method for generating a check block in the multi-disk fault-tolerant system according to claim 1, comprising:

acquiring data of all data blocks in a check group to which a check block required to be generated belongs;

acquiring check data of the check block required to be generated according to the data of all the data blocks in the check group; and writing the acquired check data in a corresponding check block in the disk array.

5. A method for recovering a data block in the multi-disk fault-tolerant system according to claim 1, comprising:

acquiring data of other data blocks in a check group to which a data block to be recovered belongs;

acquiring data of a check block in the check group to which the data block to be recovered belongs;

performing XOR calculation according to the acquired data of the other data blocks in the check group and the acquired data of the check block to acquire data of the data block to be recovered; and writing a calculated value of the data block in the data block to be recovered.

6. The method for recovering a data block in the multi-disk fault-tolerant system according to claim 5, wherein the acquiring the data of the check block in the check group to which the data block to be recovered belongs comprises:

determining a column number w of a check block of an $m^{th}$ row of the data block to be recovered according to a formula w=(j−(m−i)) % p to acquire the data of the check block, wherein i is a row number of a row in which the data block to be recovered is located, and j is a column number of a column in which the data block to be recovered is located.

7. The method for recovering a data block in the multi-disk fault-tolerant system according to claim 5, wherein the acquiring the data of the check block in the check group to which the data block to be recovered belongs comprises:

determining a column number y of a check block of an $(m+1)^{th}$ row of the data block to be recovered according to a formula y=(j−(a×m−i)/2) % p to acquire the data of the check block, wherein i is a row number of a row in which the data block to be recovered is located, and j is a column number of a column in which the data block to be recovered is located, when m−i is an odd number or smaller than 4, a is 2, and when m−i is an even number greater than or equal to 4, a is 1.

* * * * *